(12) United States Patent
Adachi (10) Patent No.: US 7,663,292 B2
(45) Date of Patent: Feb. 16, 2010

(54) ULTRASONIC ACTUATOR (75) Inventor: Yusuke Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 28 days.

(21) Appl. No.: 11/919,977

(22) PCT Filed: Jan. 9, 2007

(86) PCT No.: PCT/JP2007/050079

§ 371 (c)(1),
(2), (4) Date: Nov. 6, 2007

(87) PCT Pub. No.: WO2007/080851

PCT Pub. Date: Jul. 19, 2007

(65) Prior Publication Data

US 2009/0091213 A1  Apr. 9, 2009

(30) Foreign Application Priority Data

Jan. 12, 2006  (JP) .............................. 2006-004518

(51) Int. Cl.
*H01L 41/053* (2006.01)
*H02N 2/04* (2006.01)
*H02N 2/08* (2006.01)

(52) U.S. Cl. ............................ 310/323.16; 310/323.09; 310/355

(58) Field of Classification Search ................. 310/323.01–323.21, 328, 345, 348, 353–355
See application file for complete search history.

(56) References Cited

U.S. PATENT DOCUMENTS

| 4,728,843 | A | * | 3/1988 | Mishiro | 310/325 |
| 5,714,833 | A | * | 2/1998 | Zumeris | 310/328 |
| 6,806,620 | B1 | * | 10/2004 | Wischnewskiy | 310/323.02 |
| 6,897,598 | B2 | * | 5/2005 | Kato et al. | 310/323.02 |

FOREIGN PATENT DOCUMENTS

| JP | 07-002336 | 1/1995 |
| JP | 2000-140759 | 5/2000 |
| JP | 2004-201441 | 7/2004 |
| JP | 2005-094956 | 4/2005 |

OTHER PUBLICATIONS

Matbase, "Silicone Rubber", 2007.*
Memsnet, "Material: Lead Zirconate Titanate (PZT)", no date information.*

* cited by examiner

*Primary Examiner*—Walter Benson
*Assistant Examiner*—Derek J Rosenau
(74) *Attorney, Agent, or Firm*—McDermott Will & Emery LLP (57) ABSTRACT

An ultrasonic actuator includes: a piezoelectric element 10 producing stretching and bending vibrations; driver elements 2, 2 placed on the piezoelectric element 10 so as to be actuated in accordance with the vibrations of the piezoelectric element 10, thereby outputting a driving force; a case 12 for supporting the piezoelectric element 10; and wall-surface supporters 6A and 6B, top-surface supporters 7A and 7B and a bottom-surface supporting part 8 all placed between the case 12 and the piezoelectric element 10 to previously apply compressive forces to non-node parts of the vibrations of the piezoelectric element 10 along the directions of the vibrations.

11 Claims, 10 Drawing Sheets

ULTRASONIC ACTUATOR

RELATED APPLICATIONS

This application is the U.S. National Phase under 35 U.S.C. § 371 of International Application No. PCT/JP2007/050079, filed on Jan. 9, 2007, which in turn claims the benefit of Japanese Application No. 2006-004518, filed on Jan. 12, 2006, the disclosures of which Applications are incorporated by reference herein.

TECHNICAL FIELD

The present invention relates to oscillatory actuators for use in various electronic devices, and more particularly relates to an ultrasonic actuator for which an electromechanical transducer is used.

BACKGROUND ART

Figure 11:
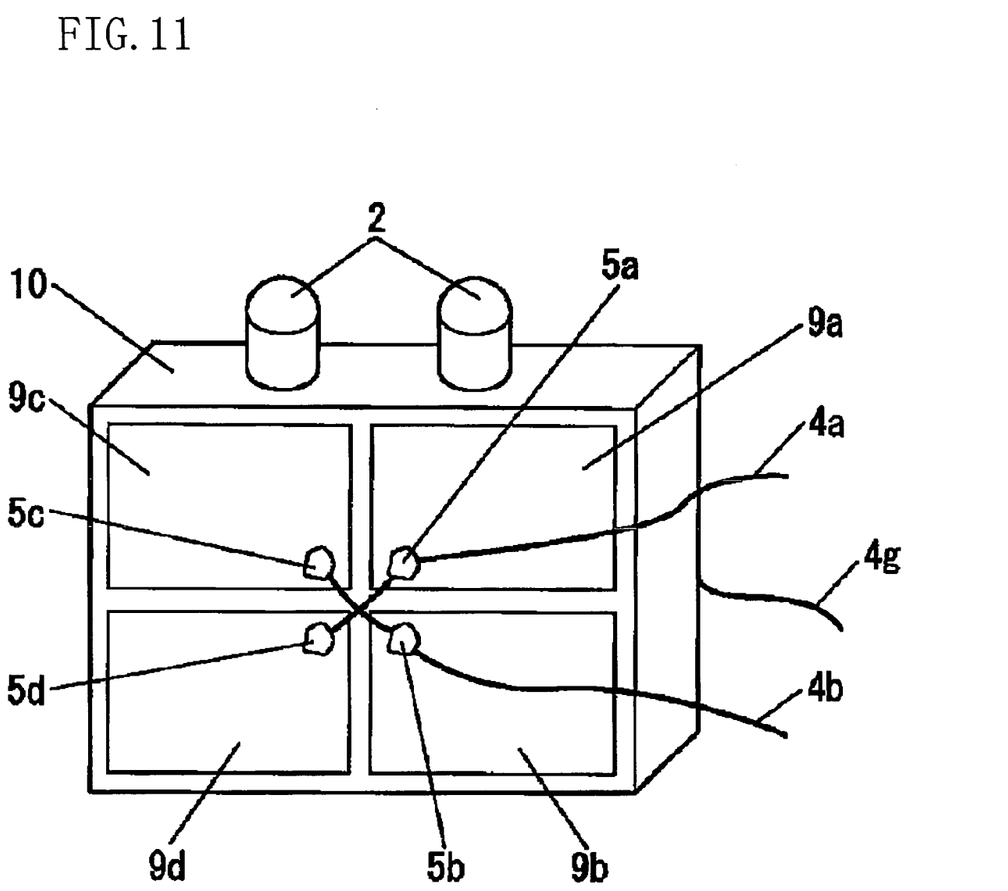
FIG. 11 is a perspective view of a piezoelectric element of a known ultrasonic actuator.
Figure 12:
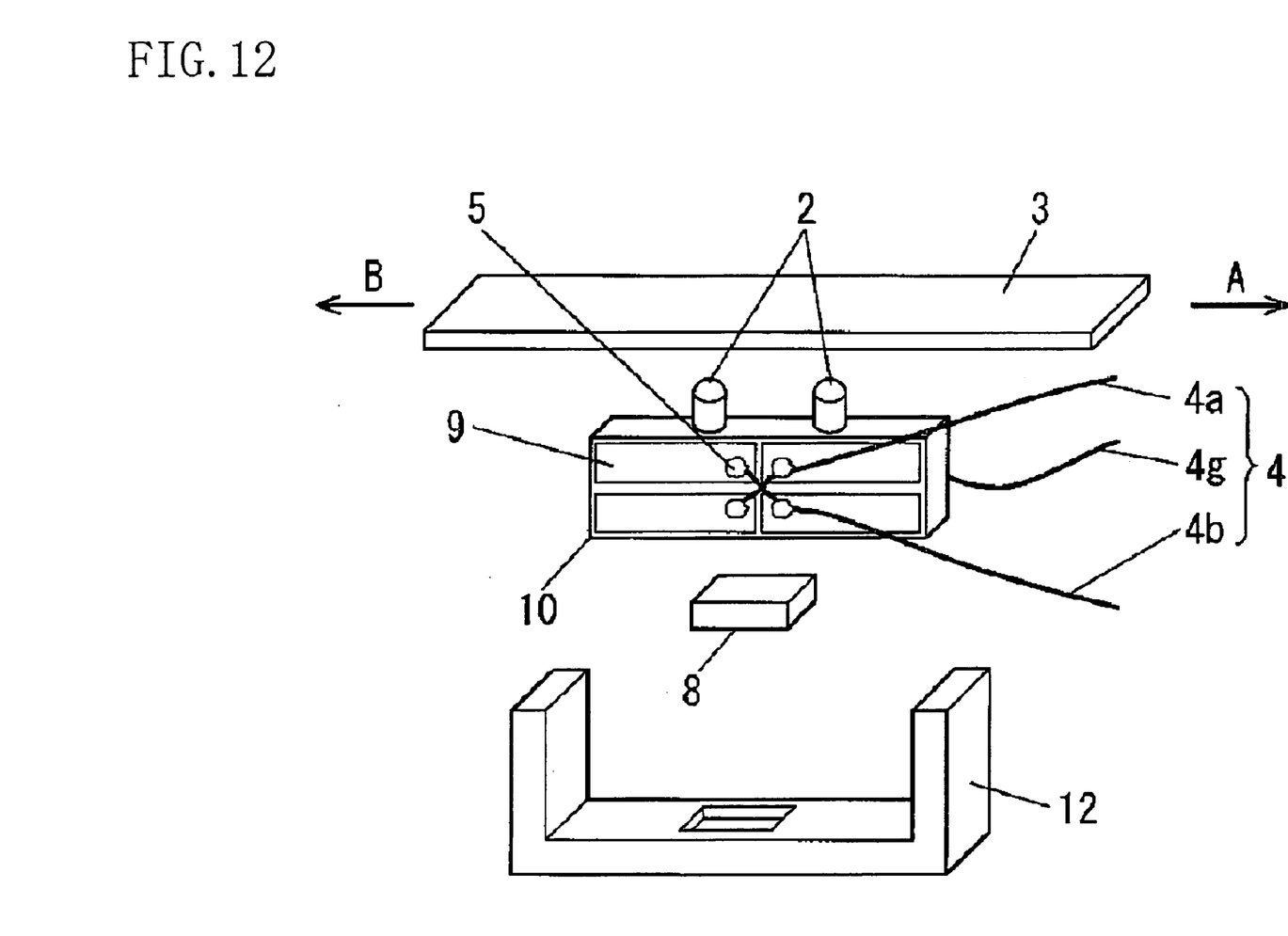
FIG. 12 is an exploded perspective view of the known ultrasonic actuator.

FIG. 12 is an exploded perspective view of a known ultrasonic actuator. FIG. 11 is a perspective view of a piezoelectric element contained in such an ultrasonic actuator.

A piezoelectric element 10 is supported on a case 12 by a bottom-surface supporting part 8 and, as illustrated in FIG. 11, formed with four divided electrodes 9a, 9b, 9c, and 9d. An entire-surface electrode (not shown) is entirely formed at the opposite side of the piezoelectric element 10 to the side thereof formed with the electrodes 9a through 9d.

A wire 4a is connected to the electrode 9a using a solder 5a and to the electrode 9d using a solder 5d. A wire 4b is connected to the electrode 9b using a solder 5b and to the electrode 9c using a solder 5c. Furthermore, a wire 4g is connected to the entire-surface electrode. Voltages are applied through these wires 4a, 4b and 4g to the piezoelectric element 10.

In FIG. 12, driver elements 2 are placed on the top surface of a piezoelectric element 10, and their distal ends are in contact with a movable object 3 so as to be pressed against the movable object 3 by the bottom-surface supporting part 8. This press increases the friction between the distal ends of the driver elements 2 and the movable object 3, thereby transmitting vibration of the piezoelectric element 10 through the driver elements 2 to the movable object 3 with more reliability.

Next, a driving method for this ultrasonic actuator will be briefly described.

Figure 3:
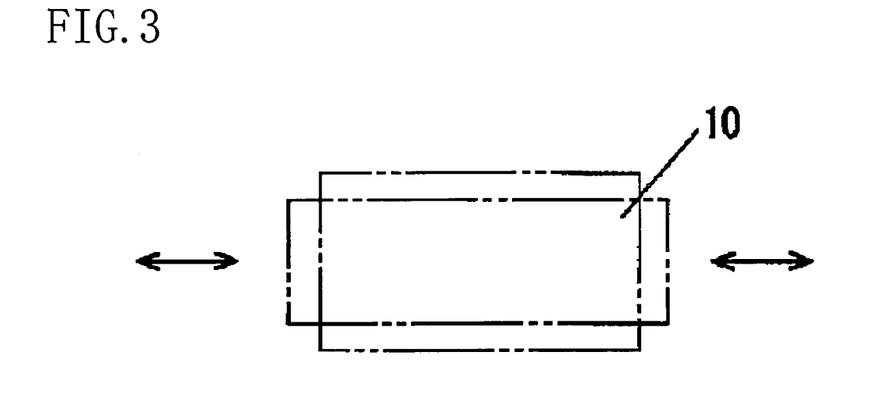
FIG. 3 is a displacement diagram of a first-order mode of stretching vibration.
Figure 4:
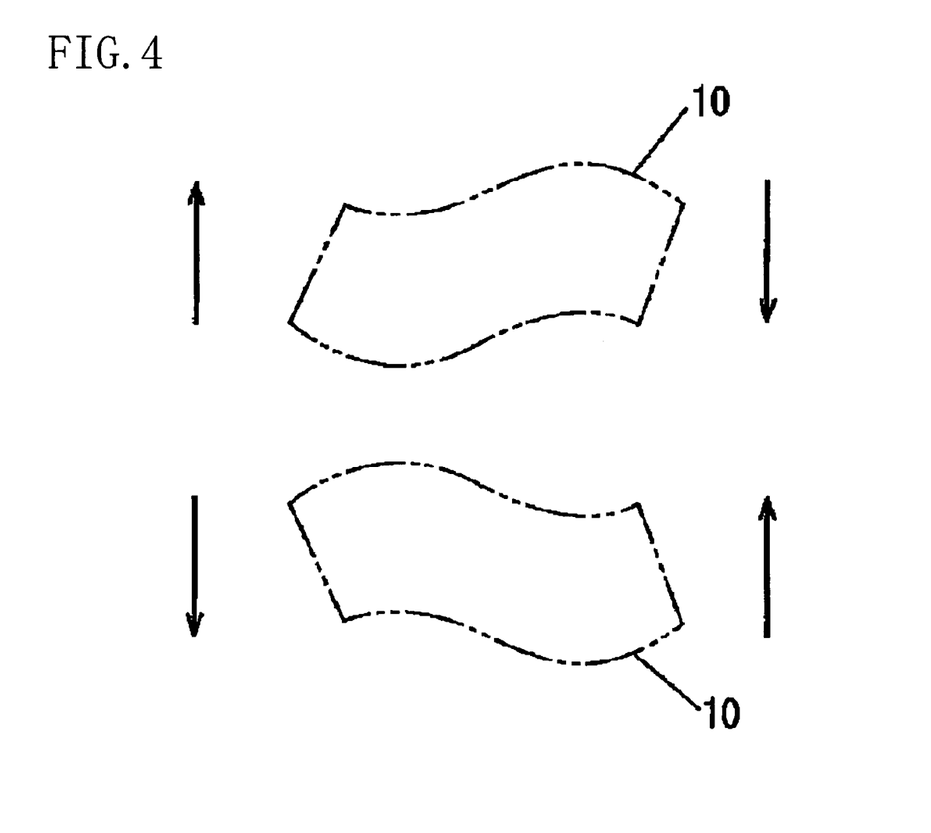
FIG. 4 is a displacement diagram of a second-order mode of bending vibration.

FIG. 3 is a displacement diagram of a first-order mode of stretching vibration (a so-called longitudinal vibration; hereinafter, referred to also as a longitudinal vibration) of the piezoelectric element 10. FIG. 4 is a displacement diagram of a second-order mode of bending vibration of the piezoelectric element 10. FIGS. 5(a) through 5(d) are conceptual diagrams for explaining the geometries of the vibrating piezoelectric element 10.

The wire 4g is connected to the ground. A sinusoidal reference voltage of a specific frequency is applied to the wire 4a, and the voltage that is 90° or −90° out of phase with the reference voltage is applied to the wire 4b. Thus, the first-order mode of stretching vibration illustrated in FIG. 3 and the second-order mode of bending vibration illustrated in FIG. 4 are induced in the piezoelectric element 10.

The respective resonance frequencies of the bending and stretching vibrations are determined by the material and shape of the piezoelectric element 10 and other factors. When these two resonance frequencies are allowed to generally coincide with each other and a voltage of a frequency close to the two generally coinciding resonance frequencies is applied to the piezoelectric element 10, the second-order mode of bending vibration and the first-order mode of stretching vibration are harmonically induced in the piezoelectric element 10. This induction causes variations in the shape of the piezoelectric element 10 as illustrated in FIGS. 5(a), 5(b), 5(c), and 5(d) in this order.

As a result, the driver elements 2 placed on the piezoelectric element 10 each produce a generally elliptical motion when viewed from the front of the paper of the drawing. More particularly, the synthesis of the bending and stretching vibrations of the piezoelectric element 10 allows the driver elements 2 to each produce an elliptical motion. This elliptical motion allows the movable object 3 supported by the driver elements 2 to move in the directions shown by the arrows A and B in FIG. 12. In this way, the piezoelectric element 10 serves as an ultrasonic actuator.

For example, Patent Document 1 has been known as information on prior art documents concerning the invention of the present application.

Patent Document 1: Japanese Unexamined Patent Application Publication No. 2005-94956

DISCLOSURE OF THE INVENTION

Problems that the Invention is to Solve

The ultrasonic actuator disclosed in Patent Document 1 can be reduced in size and cost by burning a driver element together with a piezoelectric element. Meanwhile, when the size of the ultrasonic actuator is reduced to, for example, 10 mm or less and the power applied to the ultrasonic actuator is increased to 10 mW through 10W, the strain applied to the ultrasonic actuator may exceed the elastic limit of the ultrasonic actuator. As a result, the ultrasonic actuator may be broken.

It is an object of the present invention to provide a small ultrasonic actuator that is less likely to be broken even when a high power is applied to the ultrasonic actuator.

Means of Solving the Problems

In order to achieve the above object, an ultrasonic actuator includes: an actuator body consisting of a piezoelectric element or including a piezoelectric element, said actuator body producing a plurality of vibrations along different vibration directions; a driver element placed on the actuator body so as to be actuated in accordance with the vibrations of the actuator body, thereby outputting a driving force; a base for supporting the actuator body; and a preloading unit placed between the base and the actuator body to previously apply a compressive force to a non-node part of one of the vibrations of the actuator body along the direction of the vibration of the actuator body.

EFFECTS OF THE INVENTION

Since, for an ultrasonic actuator of the present invention, a compressive force is previously applied to a non-node part of a piezoelectric element, this application can reduce the tensile stress produced in the piezoelectric element during the actuation of the ultrasonic actuator. This provides the following excellent benefits and effects: Even for a small ultrasonic actuator, a piezoelectric element is less likely to be damaged by the application of a high power to the piezoelectric element. Furthermore, the resonance frequency of each of a plurality of vibrations can be adjusted by adjusting the compressive force applied to the piezoelectric element by an associated preloading unit. Therefore, the present invention can provide an ultrasonic actuator that varies insignificantly.

DESCRIPTION OF REFERENCE NUMERALS 1 extending parts
2 driver elements
3 movable object
4, 4a, 4b, 4g wires
5, 5a, 5b, 5c, 5d solders
6A, 6B wall-surface supporters
7A, 7B top-surface supporters
8 bottom-surface supporting part
9a, 9b, 9c, 9d feed electrodes
10 piezoelectric element
14 opening
12 case

BEST MODE FOR CARRYING OUT THE INVENTION

An embodiment of the present invention will be described hereinafter with reference to the drawings.

Figure 1:
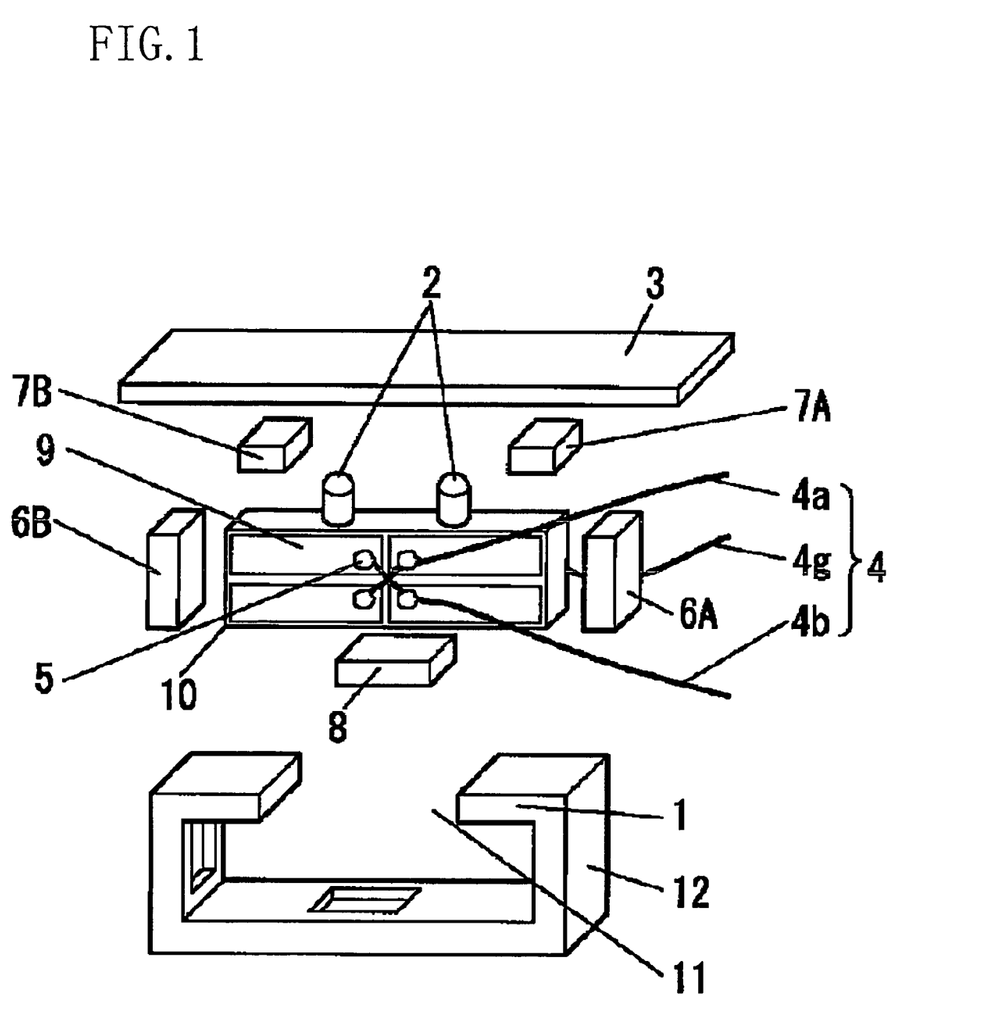
FIG. 1 is an exploded perspective view of an ultrasonic actuator according to an embodiment of the present invention.
Figure 2:
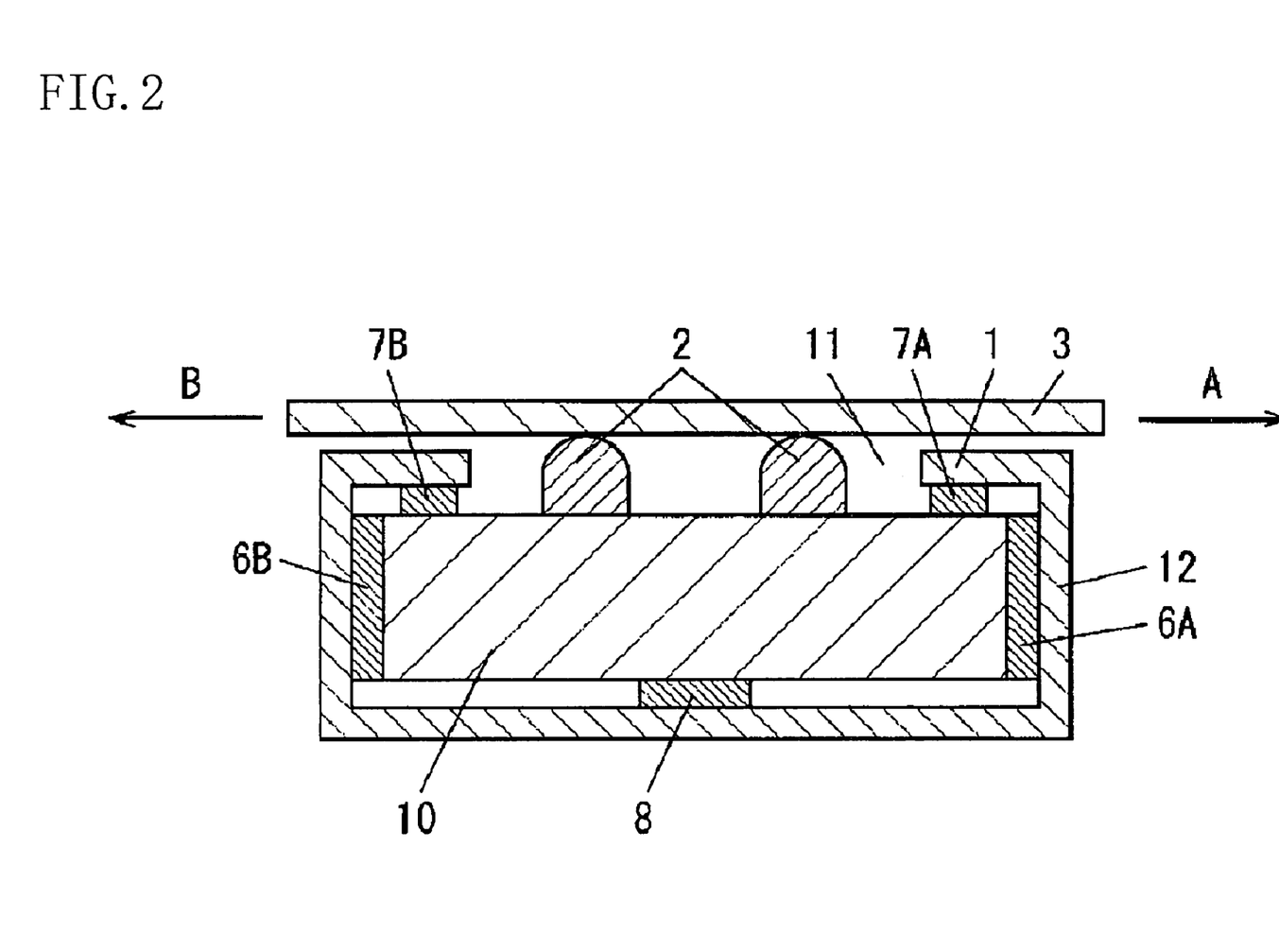
FIG. 2 is a cross-sectional view of the ultrasonic actuator.

FIG. 1 is an exploded perspective view of an ultrasonic actuator according to this embodiment. FIG. 2 is a cross-sectional view of the ultrasonic actuator. This ultrasonic actuator is small. More particularly, the length and width of this ultrasonic actuator are both less than 10 mm.

In FIG. 1, a piezoelectric element 10 forms the shape of a generally rectangular parallelepiped and has a pair of principal surfaces (front and back surfaces), both longitudinal end surfaces orthogonal to the pair of principal surfaces, and top and bottom surfaces orthogonal to the principal and longitudinal end surfaces. The piezoelectric element 10 is contained inside a case 12. Wall-surface supporters 6A and 6B are placed on the interior wall surfaces of the case 12 opposed to both the longitudinal end surfaces of the piezoelectric element 10.

A bottom-surface supporting part 8 is placed on a part of the inside bottom of the case 12 opposed to a longitudinally middle part of the bottom surface of the piezoelectric element 10, thereby supporting the piezoelectric element 10. An opening 11 is formed in an upper portion of the case 12, and the case 12 is formed with extending parts 1 extending toward the opening 11. Top-surface supporters 7A and 7B are placed between the extending parts 1 and the top surface of the piezoelectric element 10. This piezoelectric element 10 forms an actuator body. The case 12 forms a base.

Feed electrodes 9 are disposed on the front surface of the piezoelectric element 10 and connected with wires 4 by solders 5. The wires 4 are led out of through-holes (not shown) formed in the case 12. Voltages are applied through these wires 4 to the feed electrodes 9 of the piezoelectric element 10. In this way, the piezoelectric element 10 vibrates according to the frequencies of the applied voltages.

Parts of the piezoelectric element 10 provided with the solders 5 are located in the vicinity of the nodes of stretching and bending vibrations that will be described below. When these nodes are used as parts of the piezoelectric element 10 to which the wires 4 are joined, this can suppress adverse effects on the vibrations of the piezoelectric element 10, i.e., unnecessary loads imposed on the piezoelectric element 10 due to the formation of the solders 5, as much as possible.

Two driver elements 2, 2 are disposed on the top surface of the piezoelectric element 10. Each driver element 2 works according to the vibrations of the piezoelectric element 10, thereby outputting a driving force. These driver elements 2, 2 protrude outward through the opening 11 formed in the upper portion of the case 12 and are adhered to the piezoelectric element 10 so as to be prevented from being easily separated therefrom.

The ultrasonic actuator of the above-mentioned structure is configured such that, as illustrated in FIG. 2, driver elements 2, 2 abut against a movable object 3. Under such conditions, the ultrasonic actuator is configured such that the driver elements 2, 2 are pressed against the movable object 3 by applying a predetermined pressing force (for example, 1 N) from the bottom of the ultrasonic actuator to the movable object 3.

Figure 5:
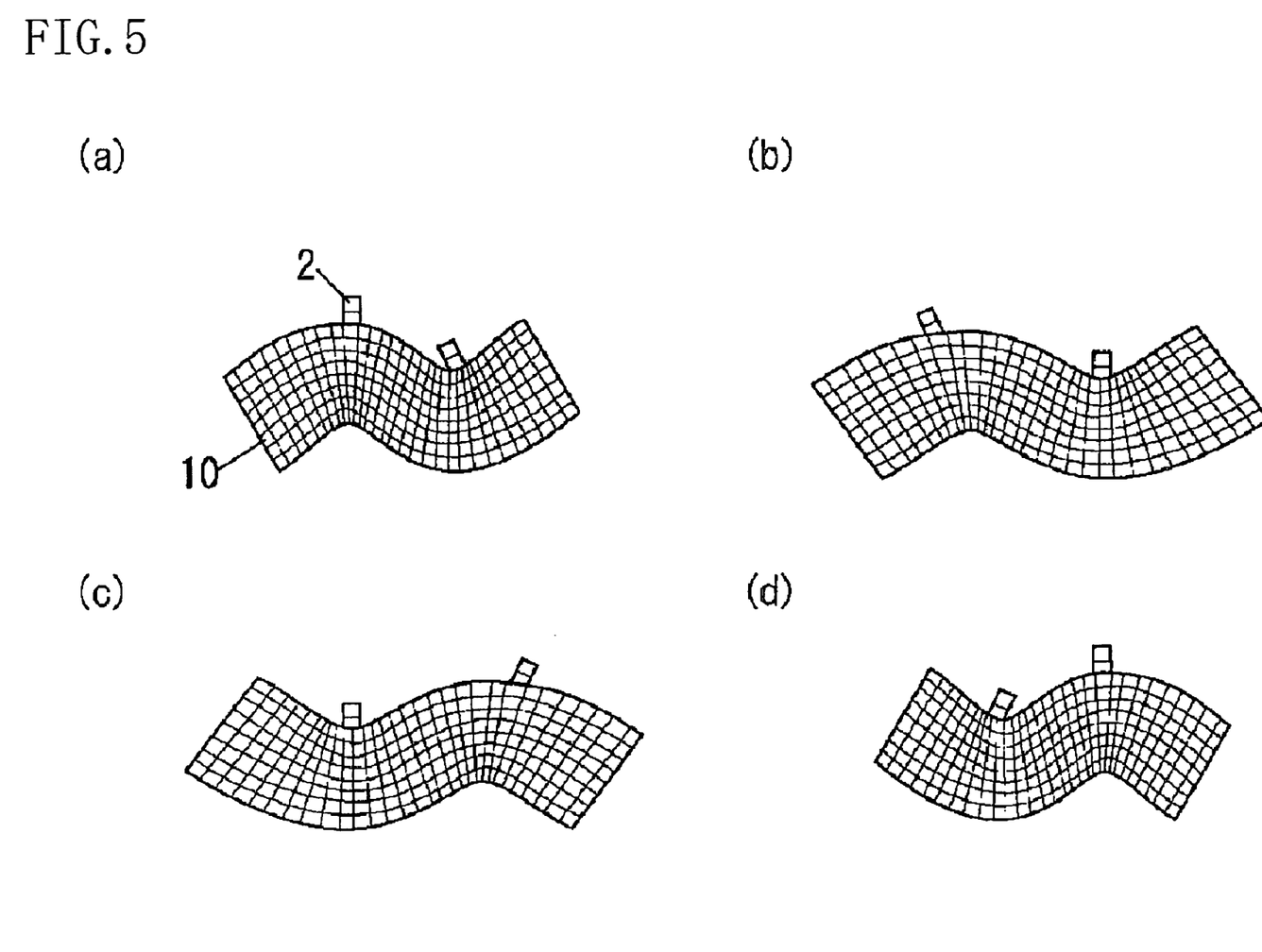
FIGS. 5(a) through 5(d) are conceptual diagrams for explaining the motions of a piezoelectric element.

Next, the motions of the ultrasonic actuator of the above-mentioned structure will be described. FIGS. 5 are conceptual diagrams illustrating the motions of the piezoelectric element 10 of the ultrasonic actuator of the present invention. FIG. 3 is a displacement diagram of a first-order mode of a stretching vibration. FIG. 4 is a displacement diagram of a second-order mode of bending vibration.

Alternating currents of specific frequencies are applied through the wires 4 to the associated feed electrodes of the piezoelectric element 10 while the driver elements 2 are pressed against the movable object 3 by applying a predetermined pressing force (for example, 1 N) from the bottom of the ultrasonic actuator illustrated in FIG. 1 to the movable object 3. Thus, the first-order mode of the stretching vibration illustrated in FIG. 3 and the second-order mode of bending vibration illustrated in FIG. 4 are induced in the piezoelectric element 10. The respective resonance frequencies of the bending and stretching vibrations are determined by the material and shape of the piezoelectric element 10 and other factors. These two resonance frequencies are allowed to generally coincide with each other, and voltages of frequencies close to the two generally coinciding resonance frequencies are applied to diagonally arranged ones of the feed electrodes 9 of the piezoelectric element 10 while being 90° or −90° out of phase with each other. Thus, the second-order mode of bending vibration and the first-order mode of stretching vibration are harmonically induced in the piezoelectric element 10. Under such conditions, the vibration direction associated with the first-order mode of the stretching vibration correspond to the direction in which the movable object 3 can move (i.e., the direction of the driving force outputted by the ultrasonic actuator), and the vibration direction associated with the second-order mode of the bending vibration correspond to the direction vertical to the direction in which the movable object 3 can move, i.e., the direction in which the piezoelectric element 10 is linked to the movable object 3 (the direction in which the driver elements 2 support the movable object 3).

The piezoelectric element 10 varies in shape as illustrated in FIGS. 5(*a*), 5(*b*), 5(*c*), and 5(*d*) in this order. As a result, the driver elements 2 placed on the piezoelectric element 10 each produce a generally elliptical motion when viewed from the front of the paper of the drawing. More particularly, the synthesis of the bending and stretching vibrations of the piezoelectric element 10 allows the driver elements 2 to each produce an elliptical motion. This elliptical motion allows the movable object 3 supported by the driver elements 2, 2 (i.e., the movable object 3 against which the driver elements 2, 2 abut) to move in the directions shown by the arrows A and B in FIG. 2. In this way, the ultrasonic actuator according to this embodiment serves as an actuator.

The piezoelectric element 10 of the ultrasonic actuator of such a configuration has a plurality of antinodes of the vibrations. The antinodes of the vibrations herein mean the locations of the maximum vibration displacement. In this embodiment, the antinodes of the vibrations include a total of two antinodes of a stretching vibration located on both longitudinal end surfaces of the piezoelectric element 10 and a total of eight antinodes of a bending vibration, i.e., four antinodes respectively located on both longitudinal ends of the top surface of the piezoelectric element 10 and both longitudinal ends of the bottom surface thereof and four antinodes respectively located 30 through 40% of the length of the piezoelectric element 10 inward from both longitudinal ends of the top surface of the piezoelectric element 10 and both longitudinal ends of the bottom surface thereof. In other words, this ultrasonic actuator has ten antinodes of the stretching and bending vibrations in total.

As illustrated in FIGS. 1 and 2, the driver elements 2, 2 are respectively disposed on two of the ten antinodes of the vibrations located 30 through 40% of the length of the piezoelectric element 10 inward from both longitudinal ends of the top surface of the piezoelectric element 10.

The wall-surface supporters 6A and 6B are respectively disposed on two of the ten antinodes of the vibrations located on both longitudinal end surfaces of the piezoelectric element 10. The top-surface supporters 7A and 7B are respectively disposed on two of the ten antinodes of the vibrations located on both longitudinal ends of the top surface of the piezoelectric element 10.

The bottom-surface supporting member 8 is disposed on a longitudinally middle part of the bottom surface of the piezoelectric element 10.

Stresses, i.e., compressive forces, are previously applied to non-node parts of the piezoelectric element 10, more particularly, the antinodes of the vibrations, by the wall-surface supporters 6A and 6B, the top-surface supporters 7A and 7B, and the bottom-surface supporting member 8. In other words, the wall-surface supporters 6A and 6B, the top-surface supporters 7A and 7B, and the bottom-surface supporting member 8 form preloading units. The "non-node parts" herein mean parts of the piezoelectric element 10 other than the nodes of the vibrations.

More particularly, the antinodes of the stretching vibration of the piezoelectric element 10 are supported by a pair of the wall-surface supporters 6A and 6B placed on both longitudinal end surfaces of the piezoelectric element 10 with the piezoelectric element 10 interposed between the pair of wall-surface supporters 6A and 6B. In this case, stresses are applied, i.e., compressive forces act on the piezoelectric element 10, along the direction parallel to the direction of the stretching vibration of the piezoelectric element 10. Furthermore, the antinodes of the bending vibration of the piezoelectric element 10 are supported by the top-surface supporters 7A and 7B respectively placed on the extending parts 1 and the bottom-surface supporting part 8 with stresses applied, i.e., with compressive forces acting on the piezoelectric element 10, along the direction parallel to the direction of the bending vibration.

Under such conditions, while the bottom-surface supporting part 8 is located on a longitudinally middle part of the piezoelectric element 10, the top-surface supporters 7A and 7B are located the same distance away from the longitudinally middle part thereof toward both longitudinal ends thereof. This allows compressive forces acting on the piezoelectric element 10 along the direction of the bending vibration to act axisymmetrically with respect to the longitudinally middle part of the piezoelectric element 10.

In other words, a relative motion between the ultrasonic actuator of the above-described configuration and the movable object 3 is produced by utilizing a first vibration mode in which the ultrasonic actuator vibrates along the direction perpendicular to the direction of drive of the movable object 3 and a second vibration mode in which the ultrasonic actuator vibrates along the direction parallel to the direction of drive of the movable object 3. The ultrasonic actuator includes at least a piezoelectric element 10, electrodes 9 disposed on the piezoelectric element 10 to feed power to the piezoelectric element 10, and driver elements 2, 2 placed on the piezoelectric element 10 to provide friction drive of the movable object 3 in the manner in which the first and second vibration modes are harmonically induced in the piezoelectric element 10 to produce an elliptical motion. Stress is applied to at least one of parts of the piezoelectric element 10 associated with the antinodes of the first and second vibration modes along the direction parallel to the direction of the associated vibration.

The wall-surface supporters 6A and 6B, the top-surface supporters 7A and 7B, and the bottom-surface supporting part 8 are all made of an elastic body.

A material having a lower elasticity than the piezoelectric element 10 and the case 12 is used as this elastic body. More specifically, an elastomer, silicone rubber, a leaf spring, or any other material is used. When an elastic body whose elastic modulus is equal to or less than one-hundredth of the elastic modulus of the piezoelectric element 10 is used, this can provide an efficient ultrasonic actuator without hindering vibrations of the piezoelectric element 10. Furthermore, in particular, the elastic modulus of silicone rubber is relatively less likely to vary even with changes in ambient temperature. This improves the reliability of the ultrasonic actuator.

Meanwhile, the piezoelectric element 10 is made of a brittle material, such as ceramic or quartz crystal. One of the features of this brittle material allows the compressive strength of the piezoelectric element 10 to be several times as large as the tensile strength thereof. When an ultrasonic actuator is driven, compressive stress and tensile stress which are equal in magnitude are produced inside the piezoelectric element 10 by vibrating the piezoelectric element 10 with resonance. When a high power of approximately 10 mW through 10 W is fed to the ultrasonic actuator, for example, by increasing the voltage applied to the ultrasonic actuator, the displacement of the ultrasonic actuator is increased, thereby producing an excessive stress. This may cause strain applied to the piezoelectric element 10 by the tensile stress to exceed the elastic limit of the ultrasonic actuator, leading to the broken piezoelectric element 10.

On the other hand, since in this embodiment compressive forces are previously applied to the antinodes of the vibrations of the piezoelectric element 10, the tensile stress produced inside the piezoelectric element 10 becomes smaller than the compressive stress produced inside the piezoelectric element 10. Even when the displacement of the ultrasonic actuator is increased, the strain arising from the tensile stress is less likely to exceed the elastic limit of the piezoelectric element 10. This improves the reliability of the ultrasonic actuator.

With an increase in the magnitude of each compressive force applied to the piezoelectric element, the effect of improving the reliability of the ultrasonic actuator is increased. Since excessively large compressive force applied to the piezoelectric element, however, prevents a bending vibration, the magnitude of the applied compressive force is desirably one to ten times the magnitude of the pressing force of the ultrasonic actuator. The pressing force of an ultrasonic actuator having a length of approximately several mm is usually approximately 0.1 N through 10 N. Therefore, the force applied to the whole piezoelectric element by the compressive forces applied to the antinodes is approximately 0.1 N through 100 N. With an increase in the volume of the ultrasonic actuator, the pressing force of an ultrasonic actuator is usually increased according to the increased volume.

The compressive forces are preferably applied from the locations which are symmetric with respect to the piezoelectric element 10 to the piezoelectric element 10. This application maintains the symmetry between the bending vibration and the stretching vibration. This maintenance stabilizes the elliptical motions of the driver elements 2 and allows an ultrasonic actuator to provide stable characteristics. More specifically, when compressive forces are applied along the direction parallel to the direction of the longitudinal stretching vibration, the compressive forces are preferably applied to the piezoelectric element 10 symmetrically with respect to the width and thickness of the piezoelectric element 10. Furthermore, when compressive forces are applied along the direction parallel to the direction of the lateral bending vibration, the compressive forces are preferably applied to the piezoelectric element 10 symmetrically with respect to the length and thickness of the piezoelectric element 10.

The bottom-surface supporting part 8 is placed on the bottom of the longitudinally middle part of the piezoelectric element 10. However, like the top-surface supporters 6, bottom-surface supporting parts 8 may be placed on both longitudinal end parts of the bottom surface of the piezoelectric element 10 associated with the antinodes of a bending vibration.

A description was given of a case where compressive forces are applied only to the antinodes of vibrations. However, some of the elastic bodies may support a wide region of the piezoelectric element 10 including the antinodes, and compressive forces may be applied to the wide region thereof.

The present invention has another effect of being able to stabilize the performance characteristics of an ultrasonic actuator.

More particularly, bending and stretching vibrations are harmonically induced in a piezoelectric element 10 of an ultrasonic actuator, thereby allowing driver elements 2, 2 to produce an elliptical motion. The characteristics of the ultrasonic actuator significantly vary according to the relative relationship between the resonance frequency of the bending vibration and the resonance frequency of the stretching vibration. When the relative relationship between the resonance frequency of the bending vibration and the resonance frequency of the stretching vibration deviates from a designed value, the characteristics of the ultrasonic actuator significantly vary.

When, like this embodiment, an ultrasonic actuator, is pressed against the movable object 3, the direction of especially a bending vibration corresponds to the direction in which the ultrasonic actuator is pressed against the movable object 3. Therefore, reaction force against the actual pressing force applied to the ultrasonic actuator acts on the piezoelectric element 10 through the driver elements 2, 2. As a result, the resonance frequency of the bending vibration is more likely to change. Even on condition that the pressing force externally applied to an ultrasonic actuator remains constant, if the ultrasonic actuator drives a movable object 3, the location of the movable object 3 may vary. Additionally, the condition of contact between each driver element 2 and the movable object 3 may vary. Thus, the pressing force substantially applied to the ultrasonic actuator may vary. In other words, the reaction force acting on the piezoelectric element 10 may vary. Therefore, the resonance frequency of the bending vibration may vary. As a result, the relative relationship between the resonance frequency of the bending vibration and the resonance frequency of the stretching vibration may vary. In view of the above, the characteristics of an ultrasonic actuator have conventionally been unstable.

To cope with this, for the ultrasonic actuator of the present invention, compressive forces are previously applied to the antinodes of the bending vibration. When, as described above, compressive forces are previously allowed to act on the piezoelectric element 10, variations in reaction force from the movable object 3 insignificantly affect the resonance frequency of the bending vibration of the piezoelectric element 10 as compared with when compressive forces are not previously allowed to act on the piezoelectric element 10. This allows the ultrasonic actuator to provide stable characteristics. In view of the above, the total magnitude of the compressive forces previously applied to the whole piezoelectric element 10 is preferably larger than the magnitude of the pressing force of the ultrasonic actuator. This can relatively restrain the reaction force acting on the piezoelectric element 10 from affecting the resonance frequency of the piezoelectric element 10.

The present invention provides still another excellent effect of being able to adjust the difference between the resonance frequency of the stretching vibration and the resonance frequency of the bending vibration (i.e., the relative relationship therebetween) by adjusting the total magnitude of the compressive forces to be previously applied to the piezoelectric element 10 (more specifically, adjusting the elastic body which applies compressive forces to the piezoelectric element 10). More particularly, the resonance frequency [Hz] of the first-order mode of stretching vibration of the piezoelectric element 10 and the resonance frequency [Hz] of the second-order mode of bending vibration thereof are expressed generally by the following Expressions (1) and (2).

[Expression 1]

$$f_{L1} = \frac{1}{2L}\sqrt{\frac{E}{\rho}} \quad (1)$$

[Expression 2]

$$f_{B2} = \frac{7.853W}{2\pi L^2}\sqrt{\frac{E}{12\rho}} \quad (2)$$

In Expressions (1) and (2), L represents the length [m] of the piezoelectric element 10 along the direction of the stretching vibration, W represents the length [m] of the piezoelectric element 10 along the direction of the bending vibration, E represents the Young's modulus [Pa] of the piezoelectric element 10, and p represents the density [kg/m³] of the piezoelectric element 10. However, the actual resonance frequency of the piezoelectric element 10 varies according to variations caused by fabrication process steps for an ultrasonic actuator, variations in the size of each driver element adhered to the piezoelectric element 10 and the location at which the driver element is adhered thereto, and other factors.

To cope with this, the resonance frequencies, especially the resonance frequency of the second-order mode of bending vibration, is changed by applying compressive forces onto the piezoelectric element 10, thereby bringing the resonance frequencies close to a desired resonance frequency.

A frequency adjustment method will be specifically described hereinafter. Standard predetermined compressive forces are applied in opposed directions from both end surfaces of a piezoelectric element 10 in the directions of a stretching vibration toward the center of the element with driver elements 2 previously placed on the piezoelectric element 10. Under such conditions, the resonance frequency $f_{B2}$ of the second-order mode of the bending vibration and the resonance frequency $f_{L1}$ of the first-order mode of stretching vibration are measured. In this case, while the resonance frequencies of the bending and stretching vibrations coincide with each other during the design phase, manufacturing variations (during manufacturing and assembly) may produce a small difference between the resonance frequencies of the bending and stretching vibrations.

The piezoelectric element 10 is implemented such that compressive forces are applied in opposed directions going from both longitudinal end surfaces of the piezoelectric element 10 toward the center thereof along the same direction as the direction of the stretching vibration by wall-surface supporters 6A and 6B formed of silicone rubber or any other material. Under the above-mentioned conditions, several kinds of wall-surface supporters 6A and 6B are prepared which have different sizes in the direction perpendicular to the direction in which the wall-surface supporters 6A and 6B are compressed (i.e., the lateral direction of the piezoelectric element 10 or the vertical direction in FIG. 2). When the piezoelectric element 10 is contained in a case, compressive forces to be applied to the piezoelectric element 10 can be changed by changing the size of the wall-surface supporters 6A and 6B. As a result, the resonance frequency of the second-order mode of the bending vibration can be changed.

Figure 6:
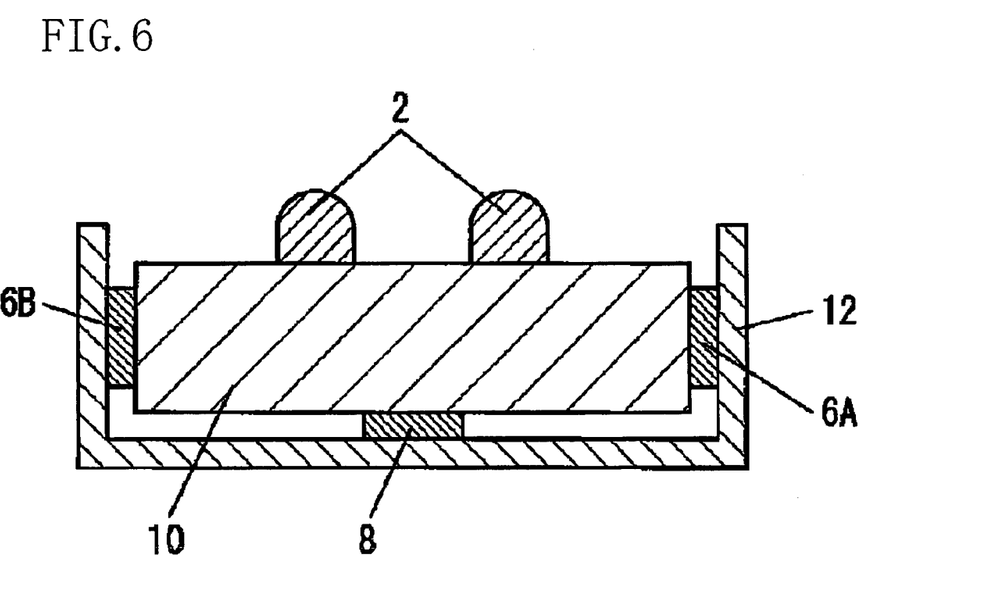
FIG. 6 is a cross-sectional view of an ultrasonic actuator supported by standard-size supporters applying compressive forces to the ultrasonic actuator.
Figure 7:
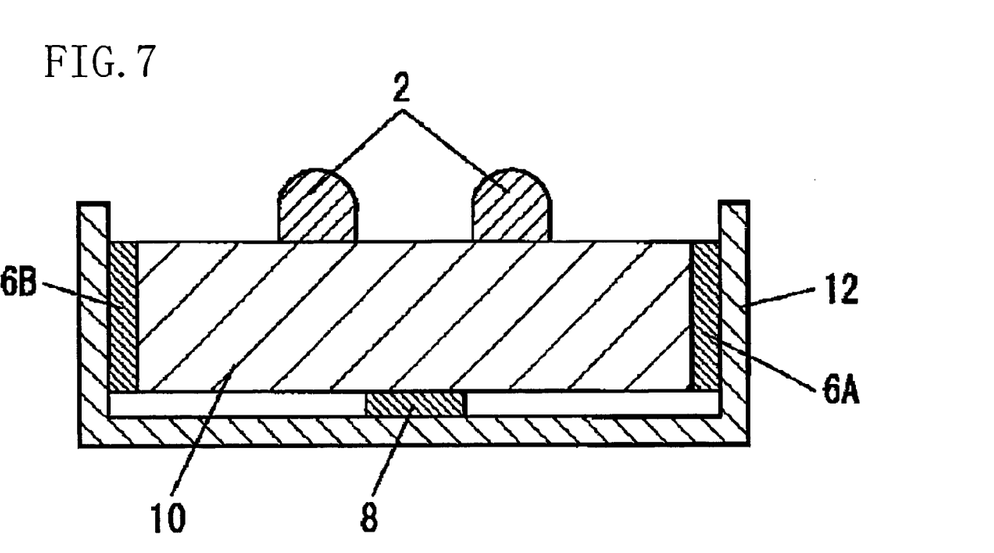
FIG. 7 is a cross-sectional view of an ultrasonic actuator that has been adjusted in frequency by supporters each having a larger size than the standard size.
Figure 8:
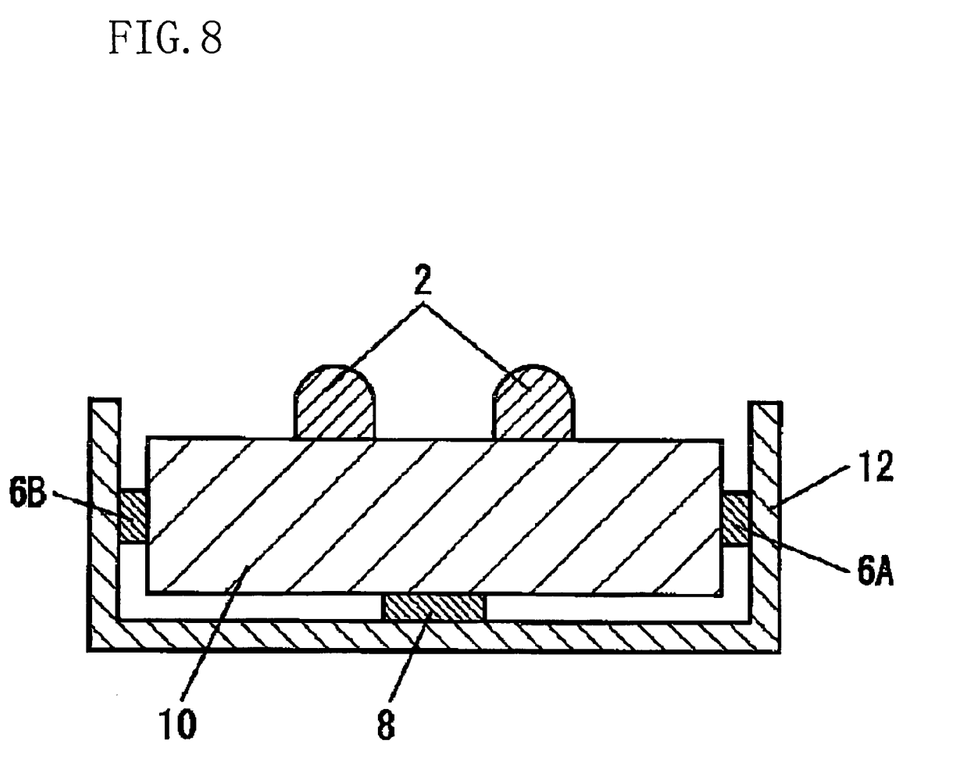
FIG. 8 is a cross-sectional view of an ultrasonic actuator that has been adjusted in frequency by supporters each having a smaller size than the standard size.

FIGS. 6 through 8 are cross-sectional views of an ultrasonic actuator that has been adjusted in frequency. A piezoelectric element 10 is supported by wall-surface supporters 6A and 6B.

When the difference between the resonance frequency $f_{B2}$ of a bending vibration and the resonance frequency $f_{L1}$ of a stretching vibration is slight ($f_{B2} \approx f_{L1}$), the piezoelectric element 10 is incorporated into a case 12 by wall-surface supporters 6A and 6B of a standard predetermined size as illustrated in FIG. 6. When the resonance frequency $f_{B2}$ of the bending vibration is smaller than the resonance frequency $f_{L1}$ of the stretching vibration ($f_{B2} < f_{L1}$), the piezoelectric element 10 is incorporated into the case 12 by wall-surface supporters 6A and 6B of a larger size than the standard predetermined size as illustrated in FIG. 7. In this case, larger compressive forces than the standard compressive force are applied to the piezoelectric element 10. When the resonance frequency $f_{B2}$ of the bending vibration is greater than the resonance frequency $f_{L1}$ of the stretching vibration ($f_{B2} > f_{L1}$), the piezoelectric element 10 is incorporated into the case 12 by wall-surface supporters 6A and 6B of a smaller size than the standard predetermined size as illustrated in FIG. 8. In this case, smaller compressive forces than the standard compressive force are applied to the piezoelectric element 10. In view of the above, even with manufacturing variations, the resonance frequencies of the stretching and bending vibrations are allowed to generally coincide with each other.

In the above-mentioned method, the resonance frequencies have previously been measured with compressive forces applied only along the direction of the stretching vibration. However, when an ultrasonic actuator is placed so as to be pressed against a movable object 3 and the resonance frequencies are measured with driver elements 2, 2 in friction contact with the movable object 3, the measurement accuracy is further increased.

Compressive forces applied to the piezoelectric element 10 are adjusted by changing the size of each of the wall-surface supporters 6A and 6B. However, compressive forces applied to the piezoelectric element 10 may be adjusted by changing the material of the wall-surface supporters 6A and 6B or changing the size of the case 12.

The frequencies are adjusted by applying compressive forces along the direction of the stretching vibration. However, the resonance frequencies may be adjusted by applying compressive forces along the direction of the bending vibration. More particularly, the resonance frequencies may be adjusted by changing the sizes, materials and other factors of top-surface supporters 7A and 7B and/or the bottom-surface supporting part 8.

In the above-mentioned method, the adjustment of the frequencies allows the resonance frequency of the stretching vibration to generally coincide with that of the bending vibration. However, the resonance frequency of the bending vibration may be adjusted to intentionally become lower than that of the stretching vibration. For such an ultrasonic actuator, the resonance frequencies of the stretching and bending vibrations hardly precisely coincide with each other. To cope with this, this ultrasonic actuator is driven at a higher drive frequency than each of the resonance frequencies of the stretching and bending vibrations (in other words, an alternating voltage of a higher frequency than each of the resonance frequencies of the stretching and bending vibrations is applied to each of feed electrodes 9 of the piezoelectric element 10). When, in such a case, the resonance frequency of the stretching vibration is adjusted to be higher than that of the bending vibration, the stretching vibration more dominantly occurs in the piezoelectric element 10. The reason for this is that the resonance frequency of the stretching vibration is closer to the drive frequency than that of the bending vibration. Since the direction of the stretching vibration is identical with the direction in which the movable object 3 can move, the stretching vibration significantly affects the maximum velocity of the ultrasonic actuator. In other words, even on condition that the resonance frequencies of the stretching and bending vibrations of the piezoelectric element 10 change according to variations in ambient temperature or the like, if the resonance frequency of the stretching vibration is set higher than that of the bending vibration, the stretching vibration dominantly occurs in the piezoelectric element 10. As a result, the maximum velocity of the ultrasonic actuator driven at a changed drive frequency is hardly changed.

Furthermore, when the frequency is to be adjusted, the resonance frequency of the bending vibration may be adjusted to intentionally become higher than that of the stretching vibration. As described above, an ultrasonic actuator producing two vibrations (stretching and bending vibrations) along different vibration directions is usually driven at a higher drive frequency than each of the resonance frequencies of the stretching and bending vibrations. The bandwidth of the bending vibration is typically narrow. In view of the above, when the resonance frequency of the bending vibration is adjusted to be higher than that of the stretching vibration, the resonance frequency of the bending vibration is brought closer to the drive frequency than when the resonance frequency of the bending vibration is lower than that of the stretching vibration. This allows the piezoelectric element 10 to sufficiently produce a bending vibration. On the other hand, since the bandwidth of the stretching vibration is wider than that of the bending vibration, this allows the piezoelectric element 10 to produce a stretching vibration even with a certain difference between the resonance frequency of the stretching vibration and the drive frequency. When the drive frequency deviates from the resonance frequency of the stretching vibration, the maximum velocity of an ultrasonic actuator driven at a changed drive frequency more gently varies than when the drive frequency is changed within the vicinity of the resonance frequency of the stretching vibration. Therefore, the ultrasonic actuator can be operated even in a low-speed range with stability.

Although, in order to adjust the frequencies, the size of both the wall-surface supporters 6A and 6B are changed, compressive forces applied to the piezoelectric element 10 may be adjusted by changing the size of one of the wall-surface supporters 6A and 6B.

<<Other Embodiments>>

The above-described embodiment of the present invention may be configured as described below.

Figure 9:
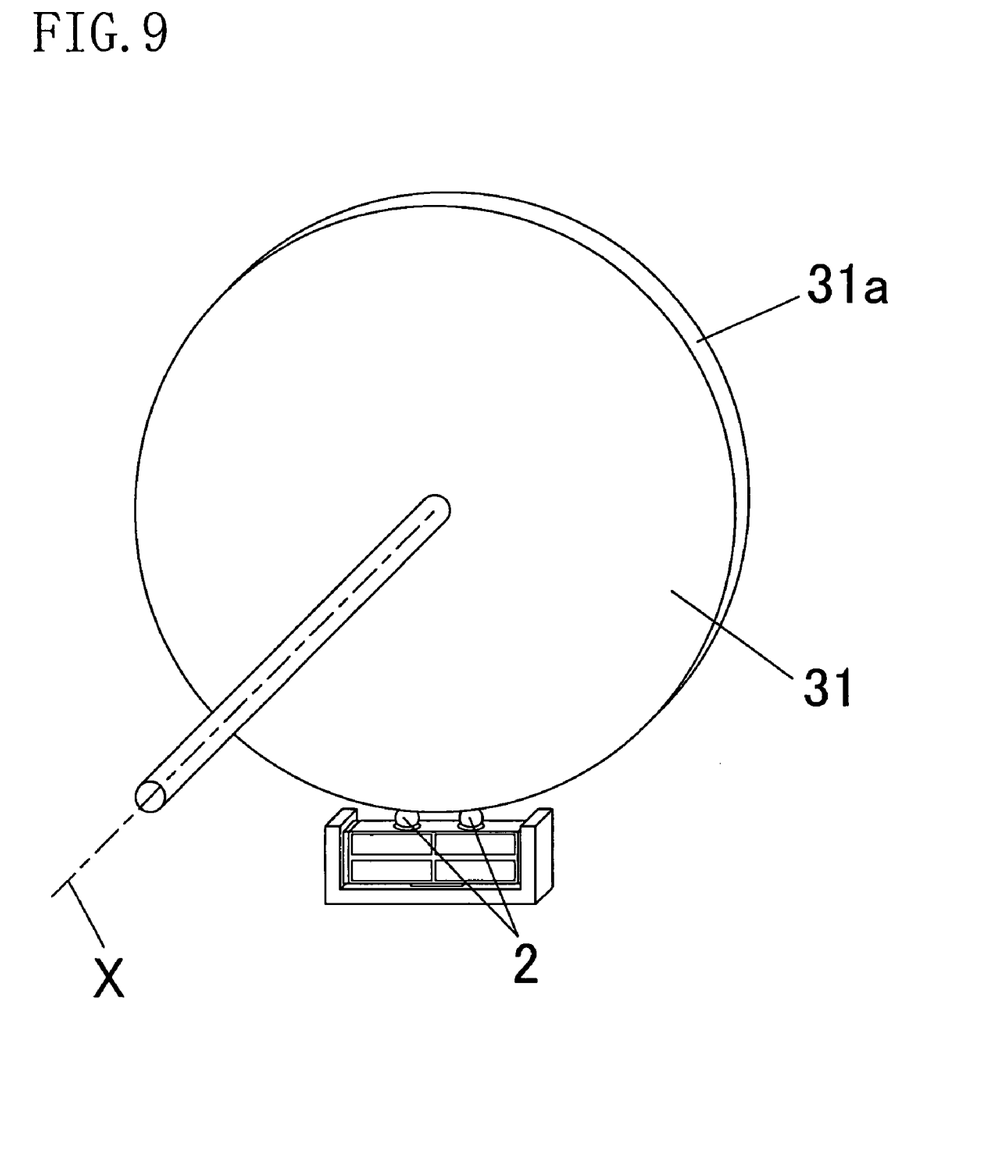
FIG. 9 is a perspective view of an ultrasonic actuator according to another embodiment.
Figure 10:
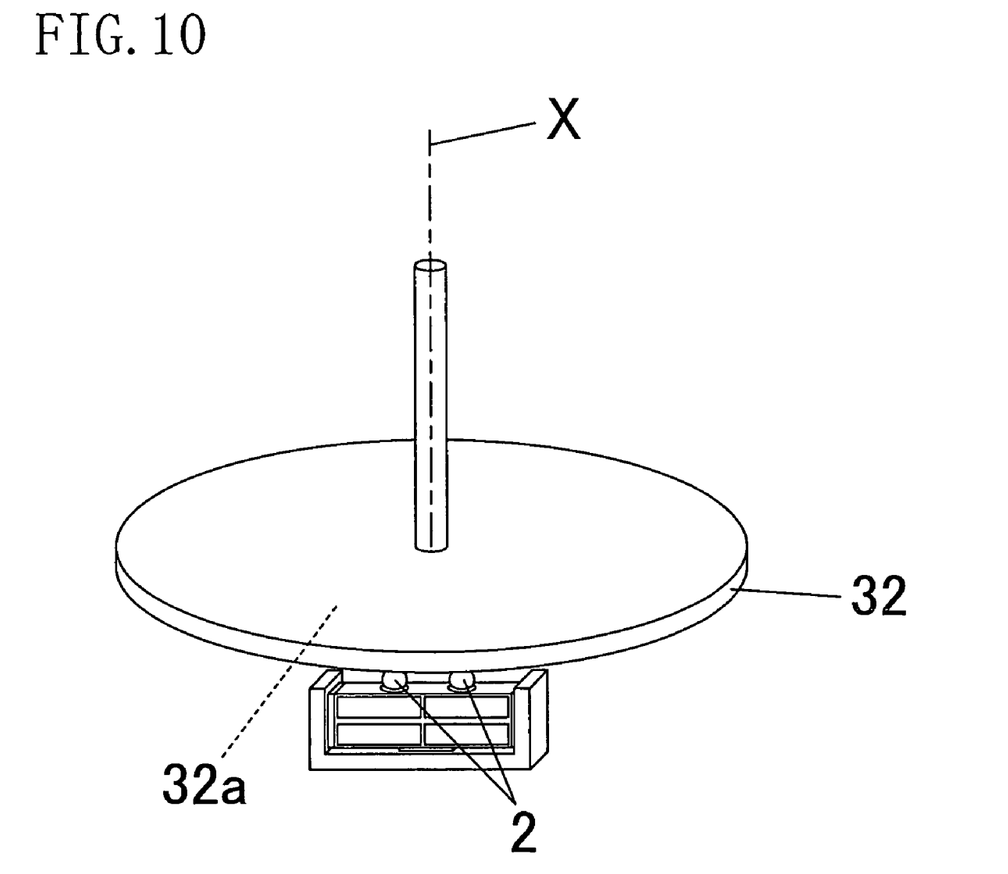
FIG. 10 is a perspective view of an ultrasonic actuator according to still another embodiment.

More particularly, in the above-described embodiment of the present invention, a movable object 3 driven by applying the driving force of an ultrasonic actuator to the movable object 3 is flat-shaped. However, this is not restrictive. Any structure can be adopted as the structure of a movable object. For example, as illustrated in FIG. 9, a movable object may be a disk 31 rotatable about the predetermined axis X, and driver elements 2, 2 of an ultrasonic actuator may abut against the edge surface 31a of the disk 31. When an ultrasonic actuator of this structure is driven, a generally elliptical motion of the driver elements 2, 2 allows the disk 31 to rotate about the predetermined axis X. Alternatively, as illustrated in FIG. 10, a movable object may be a disk 32 rotatable about the predetermined axis X, and driver elements 2, 2 of an ultrasonic actuator may abut against a flat part 32a of the disk 32. When an ultrasonic actuator of this structure is driven, a generally elliptical motion of the driver elements 2, 2 allows the disk 32 to be driven in a tangential direction of a part of the disk 32 abutting against the driver elements 2, 2. As a result, the disk 32 is rotated about the predetermined axis X.

In the above-described embodiment, a single plate structure in which electrodes are formed only on the front and back surfaces of a piezoelectric ceramic plate was described. However, a multilayer structure in which piezoelectric ceramic plates and internal electrodes are alternately stacked also provides the same effect.

The piezoelectric element 10 itself harmonically produces stretching and bending vibrations herein. However, the structure in which a piezoelectric element 10 is adhered to a substrate made of a metal or any other material and the structure in which a piezoelectric element 10 is incorporated into a resonator formed of a metal or any other material also provide the same effect. In this case, a combination of the resonator and the piezoelectric element forms an actuator body and is placed in a case with compressive forces previously applied to the combination.

In the above-described embodiment, compressive forces are applied to the antinodes of both stretching and bending vibrations of a piezoelectric element 10. However, in view of the material of a piezoelectric element 10, the amount of deformation of the piezoelectric element 10 during the drive of an ultrasonic actuator, and other factors, compressive forces may be applied only to the antinodes of one of the vibrations which is more likely to damage the piezoelectric element 10.

The above-mentioned embodiments are essentially preferable examples and not intended to limit the present invention, its application, or the scope of uses.

INDUSTRIAL APPLICABILITY

Since, for an ultrasonic actuator of the present invention, compressive forces are previously applied to the antinodes of vibrations of a piezoelectric element, this application can reduce the tensile stress produced in the piezoelectric element during the actuation of the ultrasonic actuator. This provides the following excellent benefits and effects: Even for a small ultrasonic actuator whose length and width are both less than 10 mm, a piezoelectric element is less likely to be damaged by the application of a high power of approximately 10 mW through 10 W to the piezoelectric element. Furthermore, the resonance frequency of each vibration can be adjusted by adjusting elastic bodies for applying compressive forces to the piezoelectric element. Therefore, the present invention can provide an ultrasonic actuator that varies insignificantly, and is useful, in particular, for electronic devices that need to be reduced in size.

The invention claimed is:

1. An ultrasonic actuator comprising:
   an actuator body including a piezoelectric element in whole or in a part, the actuator body being operable to produce a plurality of vibrations along different vibration directions, the plurality of vibrations including a longitudinal vibration;
   a driver element placed on the actuator body, the driver element being actuated in accordance with the vibrations of the actuator body, thereby producing a driving force;
   a base for supporting the actuator body; and
   loading units including an elastic body and placed between the base and the actuator body to apply compressive forces by an elastic force of the elastic body to a non-node part of the longitudinal vibration of the actuator body along the direction of the longitudinal vibration of the actuator body from both sides of the actuator body to the center of the actuator body.

2. The ultrasonic actuator of claim 1, wherein the loading units are located on a portion other than a portion where the driver element is provided.

3. The ultrasonic actuator of claim 1, wherein the loading units are located on an antinode of the vibration of the actuator body.

4. The ultrasonic actuator of claim 1, wherein the elastic modulus of the elastic body is equal to or less than one-hundredth of an elastic modulus of the piezoelectric element.

5. The ultrasonic actuator of claim 1, wherein the elastic body is made of silicone rubber.

6. The ultrasonic actuator of claim 1, wherein the driver element is pressed against a movable object to which a driving force is to be applied, and the compressive forces applied by the loading units are larger than the pressing force of the driver element pressed against the movable object.

7. The ultrasonic actuator of claim 1, wherein the actuator body is operable to produce a second-order mode of bending vibration and a first-order mode of longitudinal vibration.

8. The ultrasonic actuator of claim 1, wherein the actuator body is operable to produce a first vibration and a second vibration having different vibration directions with each other, and the compressive forces of the loading unit allow a resonance frequency of the first vibration to coincide with the resonance frequency of the second vibration.

9. The ultrasonic actuator of claim 1, wherein the actuator body is operable to produce a first vibration and a second vibration having different vibration directions with each other, and the compressive forces of the loading units allow a resonance frequency of the second vibration to become higher than the resonance frequency of the first vibration.

10. The ultrasonic actuator of claim 9, wherein the first vibration is a longitudinal vibration parallel to the direction of the driving force, and the second vibration is a bending vibration.

11. The ultrasonic actuator of claim 9, wherein the second vibration is a longitudinal vibration parallel to the direction of the driving force, and the first vibration is a bending vibration.

* * * * *